United States Patent
Kumagai

[11] Patent Number: 6,045,481
[45] Date of Patent: Apr. 4, 2000

[54] CONTROL SYSTEM FOR A TOROIDAL CONTINUOUSLY VARIABLE TRANSMISSION

[75] Inventor: Tomoharu Kumagai, Wako, Japan

[73] Assignee: Honda Giken Kogyo Kabushiki Kaisha, Tokyo, Japan

[21] Appl. No.: 09/264,893

[22] Filed: Mar. 9, 1999

[30] Foreign Application Priority Data

Mar. 10, 1998 [JP] Japan ................... 10-057605

[51] Int. Cl.[7] .................... B60K 41/12; F16H 13/10; F16H 15/38
[52] U.S. Cl. ................. 477/37; 476/41; 476/42
[58] Field of Search ................ 477/37; 701/60, 701/61; 476/41, 42

[56] References Cited

U.S. PATENT DOCUMENTS

| | | | |
|---|---|---|---|
| 4,481,844 | 11/1984 | Ironside et al. | 477/37 |
| 5,042,326 | 8/1991 | Hibi et al. | 477/37 X |
| 5,538,483 | 7/1996 | Kobayashi et al. | 476/42 X |
| 5,885,185 | 3/1999 | Kidokoro et al. | 476/42 X |
| 5,935,039 | 8/1999 | Sakai et al. | 477/37 X |

FOREIGN PATENT DOCUMENTS 8-233085  9/1996  Japan .

*Primary Examiner*—Charles A. Marmor
*Assistant Examiner*—Roger Pang
*Attorney, Agent, or Firm*—Nikaido, Marmelstein, Murray & Oram LLP

[57] ABSTRACT

A control system for a toroidal continuously variable transmission which can control the transmission ratio without installing a position detection device or an angle detection device on trunnions and secure a sufficient control response to prevent hunting of the transmission ratio. To realize this control system, an axial force calculation device M3 calculates the axial force 2Ft in the trunnion axis direction that the transmission ratio control actuators are required to generate, based on the transmission ratio i calculated by a transmission ratio calculation device M1 from the input disk revolution speed $\omega_1$ and the output disk revolution speed $\omega_2$, and on the input torque Ti or output torque To estimated by a torque estimation device M2. An axial force change calculation device M4 calculates the amount of change in the axial force $\Delta$Ft based on the deviation between the target transmission ratio ic and the transmission ratio i. A target axial force calculation device M5 adds the axial force 2Ft to the amount of change in the axial force $\Delta$Ft to calculate the target axial force Fc. An actuator drive device M6 drives the actuators according to the target axial force Fc to match the transmission ratio i to the target transmission ratio ic.

2 Claims, 7 Drawing Sheets ial force calculated by the axial force calculation means and the amount of change in the axial force calculated by the axial force change amount calculation means and wherein, based on the target axial force

CONTROL SYSTEM FOR A TOROIDAL CONTINUOUSLY VARIABLE TRANSMISSION

BACKGROUND OF THE INVENTION

1. Field of the Invention

The present invention relates to a toroidal continuously variable transmission that performs a continuous or stepless speed change by changing a tilt angle of power rollers places in abutment against both an input disk and an output disk arranged opposed to each other, and more particularly to a control system that controls a transmission ratio of the toroidal continuously variable transmission to match a target transmission ratio.

2. Description of Related Art

A known example of such a control system for the toroidal continuously variable transmission is disclosed in Japanese Patent Application Laid-Open No. 8-233085.

This control system includes a position detection means for detecting a positional displacement y in the trunnion axis direction of power rollers supported on the trunnion, and an angle detection means for detecting a tilt angle $\phi$ of the power rollers about the trunnion axis. The control system calculates an actual transmission ratio i of the toroidal continuously variable transmission from the tilt angle $\phi$ detected by the angle detection means and, based on a deviation between the transmission ratio i and a target transmission ratio ic, calculates a target positional displacement yc of the power rollers in the trunnion axis direction. A feedback control is performed to make zero the deviation between the transmission ratio i and the target transmission ratio ic by displacing the trunnions in the trunnion axis direction by hydraulic actuators, to match the positional displacement y of the power rollers in the trunnion axis direction detected by the position detection means to the target positional displacement yc.

FIG. 7 shows a block diagram of the conventional control system for the toroidal continuously variable transmission.

The conventional control system has following problems; because the position detection means and the angle detection means must be installed at either end of the trunnion, the size of the trunnion in its axial direction increases, resulting in deteriorating the mountable tolerance of the transmission in a vehicle body or reducing the ground clearance or minimum height of the vehicle body from the ground. Further, because the position detection means and the angle detection means generally cannot be installed in oil, it is necessary to install these detecting means outside the transmission case or to prevent oil from contact with the means by oil seals, which in turn complicates the arrangement of the control system.

Further, an axial force 2Ft in the trunnion axis direction that is applied from an input disk and an output disk to the power rollers has a great effect as external disturbance acting on the feedback control of the positional displacement y of the power rollers. Thus, with the conventional method that first detects a positional displacement y and then calculates its deviation from a target positional displacement yc to operate the hydraulic actuators, not only a sufficient response can not be obtained, but there is a possibility hunting may be generated in the determinaton of the transmission ratio.

SUMMARY OF THE INVENTION

The present invention has been accomplished under the circumstances described above, and is designed to be able to control the transmission ratio without installing a position detection means or an angle detection means on trunnions, and to secure a sufficient control response to prevent hunting of the transmission ratio.

To achieve the above object, according to a first feature of the invention, a control system for a toroidal continuously variable transmission is provided which comprises an input disk and an output disk which are disposed opposed to each other, power rollers which are in abutment against the input disk and the output disk to conduct transmission of a driving force between the input disk and the output disk, trunnions for supporting the power rollers rotatably, the trunnions being supported displaceably in the direction of an axis of the trunnions, and tiltably about the axis, an actuator for displacing the trunnions in the direction of the trunnion axes to tilt the power rollers together with the trunnions, and a control means for driving the actuator to control a transmission ratio between the input disk and the output disk, wherein the control means comprises an input rotation speed detection means for detecting a rotation speed of the input disk, an output rotation speed detection means for detecting a rotation speed of the output disk, a transmission ratio calculation means for calculating the transmission ratio from the input disk rotation speed and the output disk rotation speed, a torque estimation means for estimating one an input torque of the input disk and an output torque of the output disk, an axial force calculation means for calculating an axial force in the trunnion axis direction that the actuator is required to generate, based on the transmission ratio calculated by the transmission ratio calculation means and the torque estimated by the torque estimation means, and an actuator drive means for driving the actuators based on the axial force calculated by the axial force calculation means.

With the above arrangement of the first feature, because the transmission ratio can be controlled based on the input disk revolution speed and the output disk revolution speed, there is no need for the position detection means for detecting the positional change of the power rollers in the trunnion axis direction, and the angle detection means for detecting the tilt angle of the power rollers about the trunnion axes. This prevents the trunnions from becoming large as they would when mounted with these detection means, thus reducing the overall size of the toroidal continuously variable transmission. Further, because the trunnion axial force which is the most influential disturbance factor, is calculated based on the input torque of the input disk or the output torque of the output disk, it is possible to enhance the control response to prevent the hunting of the transmission ratio caused by changes in the input/output torques and input/output revolution speeds by performing the feedforward control, that predicts and compensates for the axial force of the trunnions, without executing the feedback control on the positional change of the power rollers in the trunnion axis direction.

According to a second feature of the invention in addition to the arrangement of the first feature, a control system for a toroidal continuously variable transmission is provided in which the control system further includes an axial force change amount calculation means for calculating an amount of change in the axial force based on a deviation between a target transmission ratio and the transmission ratio calculated by the transmission ratio calculation means and a target axial force calculation means for calculating a target axial force based on the axial force calculated by the axial force calculation means and the amount of change in the axial force calculated by the axial force change amount calculation means and wherein, based on the target axial force calculated by the target axial force calculation means, the actuator drive means drives the actuators to converge the deviation to zero.

With the above arrangement of the second feature, because the amount of change in the axial force is calculated based on the deviation between the target transmission ratio and the transmission ratio and the actuators are driven according to the target axial force calculated from the axial force and the amount of change in the axial force, a feedback control system can be obtained that can converge the transmission ratio to the target transmission ratio, thereby performing a highly precise transmission ratio control.

These and other objects, features and advantages of this invention will become apparent from the detailed description of a preferred embodiment of this invention with reference to the accompanying drawings.

BRIEF DESCRIPTION OF THE DRAWINGS

FIGS. 1 through 6 show one embodiment of this invention; wherein

FIG. 1 is a skeleton diagram of a transmission for a vehicle having a toroidal continuously variable transmission;

FIG. 2 is an enlarged view of an essential part of the toroidal continuously variable transmission of FIG. 1;

FIG. 3 is a cross section taken along a line 3—3 of FIG. 2;

FIG. 4 is a flow chart showing an operation of the embodiment of the invention;

FIG. 5 is a block diagram of a control system of the embodiment of the invention; and FIG. 6 is a block diagram corresponding to claims of the embodiment of the invention.

DETAILED DESCRIPTION OF THE PREFERRED EMBODIMENT

Now, one embodiment of the present invention will be described by referring to the accompanying drawings.

Figure 1:
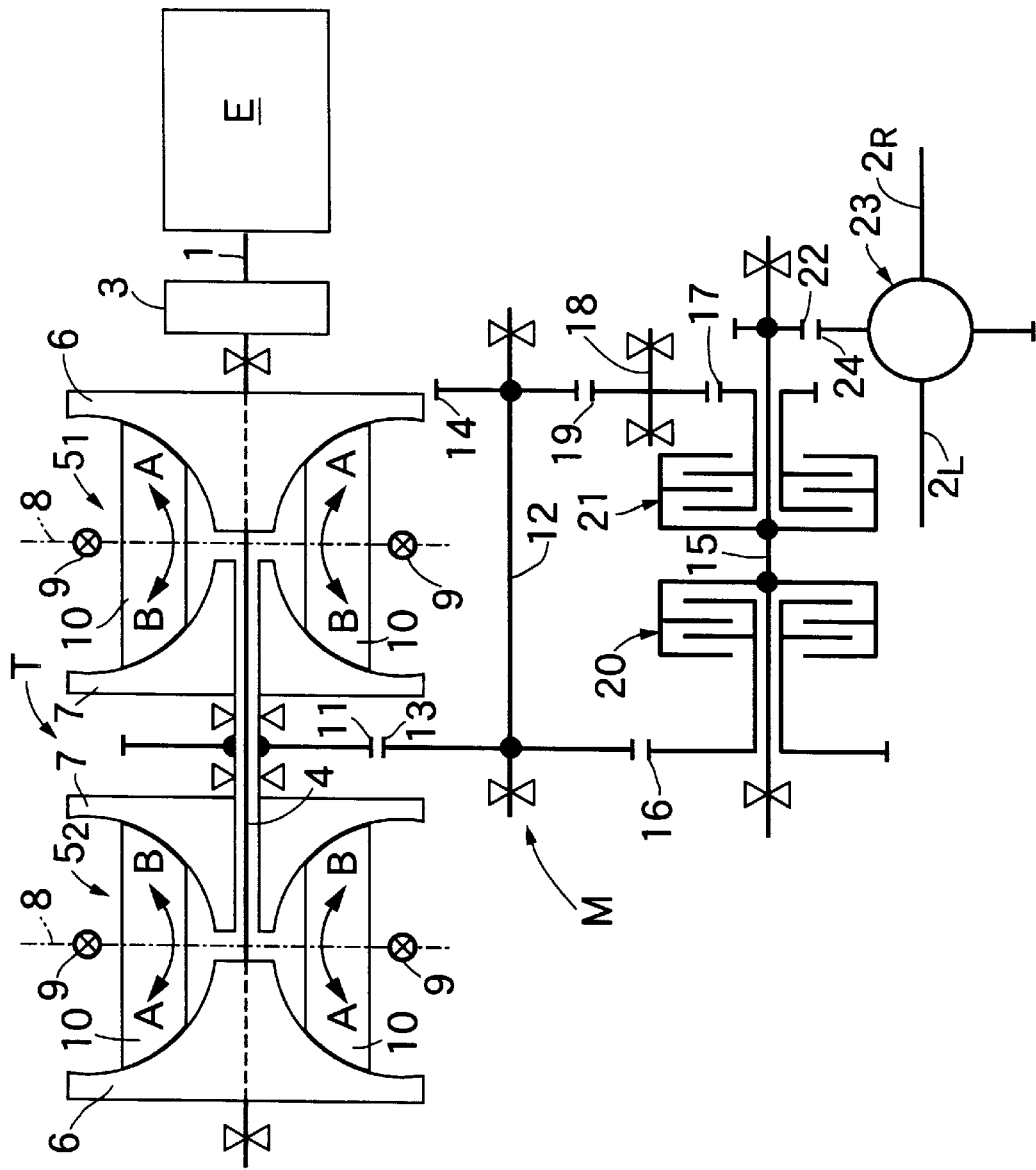

As shown in FIG. 1, a transmission M for an automobile has a toroidal continuously variable transmission T, which continuously changes the rotation speed of a crankshaft 1 of an engine E and transfers the speed-changed rotation to left and right axles $2_L$, $2_R$. On a main shaft 4 that is connected to the crankshaft 1 through a torque converter 3 are supported a first continuously variable speed change mechanism $5_1$ and a second continuously variable speed change mechanism $5_2$, both having virtually the same construction. The first continuously variable speed change mechanism $5_1$ has a substantially cone-shaped input disk 6 secured to the main shaft 4, a substantially cone-shaped output disk 7 relatively rotatably supported on the main shaft 4, and a pair of power rollers 10, 10, that are rotatably supported on roller shafts 8, are supported tiltable about trunnion axes 9, 9 and are engaged with both the input disk 6 and the output disk 7. The opposed surfaces of the input disk 6 and the output disk 7 are comprised of toroidal curved surfaces. As the power rollers 10, 10 tilt about the trunnion axes 9, 9, the contact points of the power rollers 10, 10 on the input disk 6 and the output disk 7 change. The second continuously variable speed change mechanism 52 is arranged plane-symmetrically to the first continuously variable speed change mechanism $5_1$ with respect to an output gear 11 installed therebetween.

When each of the power rollers 10, 10 tilts in the direction of each of the arrows A, each contact point thereof on the input disk 6 moves radially outwardly with respect to the main shaft 4, and the contact point thereof on the output disk 7 moves radially inwardly with respect to the main shaft 4. Hence, the rotation of the input disk 6 increases and is transferred to the output disk 7 with the result that the transmission ratio of the toroidal continuously variable transmission M changes continuously toward the overdrive side. On the other hand, when each of the power rollers 10, 10 is tilted in the direction of each of the arrows B, the contact point thereof on the input disk 6 shifts radially inwardly with respect to the main shaft 4 and the contact point thereof on the output disk 7 shifts radially outwardly with respect to the main shaft 4. The rotation of the input disk 6 reduces and is transferred to the output disk 7 with the result that the transmission ratio of the toroidal continuously variable transmission M changes continuously toward the low-speed side.

The output gear 11 is disposed between the first continuously variable speed change mechanism $5_1$ and the second continuously variable speed change mechanism $5_2$ and is supported relatively rotatably on the main shaft 4. The output gear 11 is coupled to the output disks 7, 7 of the two continuously variable speed change mechanisms $5_1$, $5_2$ and thus rotates integrally with these output disks. A counter shaft 12 arranged parallel to the main shaft 4 has a counter forward gear 13 and a counter reverse gear 14 secured thereto. The counter forward gear 13 meshes with the output gear 11. A secondary shaft 15 arranged parallel to the counter shaft 12 has relatively rotatably supported thereon a secondary forward gear 16 and a secondary reverse gear 17. The secondary forward gear 16 meshes with the counter forward gear 13, and the secondary reverse gear 17 meshes with the counter reverse gear 14 through an idler gear 19 disposed on an idler shaft 18.

The secondary shaft 15 is mounted with a forward clutch 20 for coupling the secondary forward gear 16 to the secondary shaft 15, and with a reverse clutch 21 for coupling the secondary reverse gear 17 to the secondary shaft 15. A final drive gear 22 secured to the secondary shaft 15 meshes with a final driven gear 24 disposed to a differential gear 23.

When the forward clutch 20 is engaged, the rotation of the output gear 11 of the toroidal continuously variable transmission T rotates the left and right axles $2_L$, $2_R$ R forward through the counter forward gear 13, the secondary forward gear 16, the forward clutch 20, the secondary shaft 15, the final drive gear 22, the final driven gear 24 and the differential gear 23. When the reverse clutch 21 is engaged, the rotation of the output gear 11 of the toroidal continuously variable transmission T rotates the left and right axles $2_L$, $2_R$ backward through the counter forward gear 13, the counter shaft 12, the counter reverse gear 14, the idler gear 19, the secondary reverse gear 17, the reverse clutch 21, the secondary shaft 15, the final drive gear 22, the final driven gear 24 and the differential gear 23.

Figure 2:
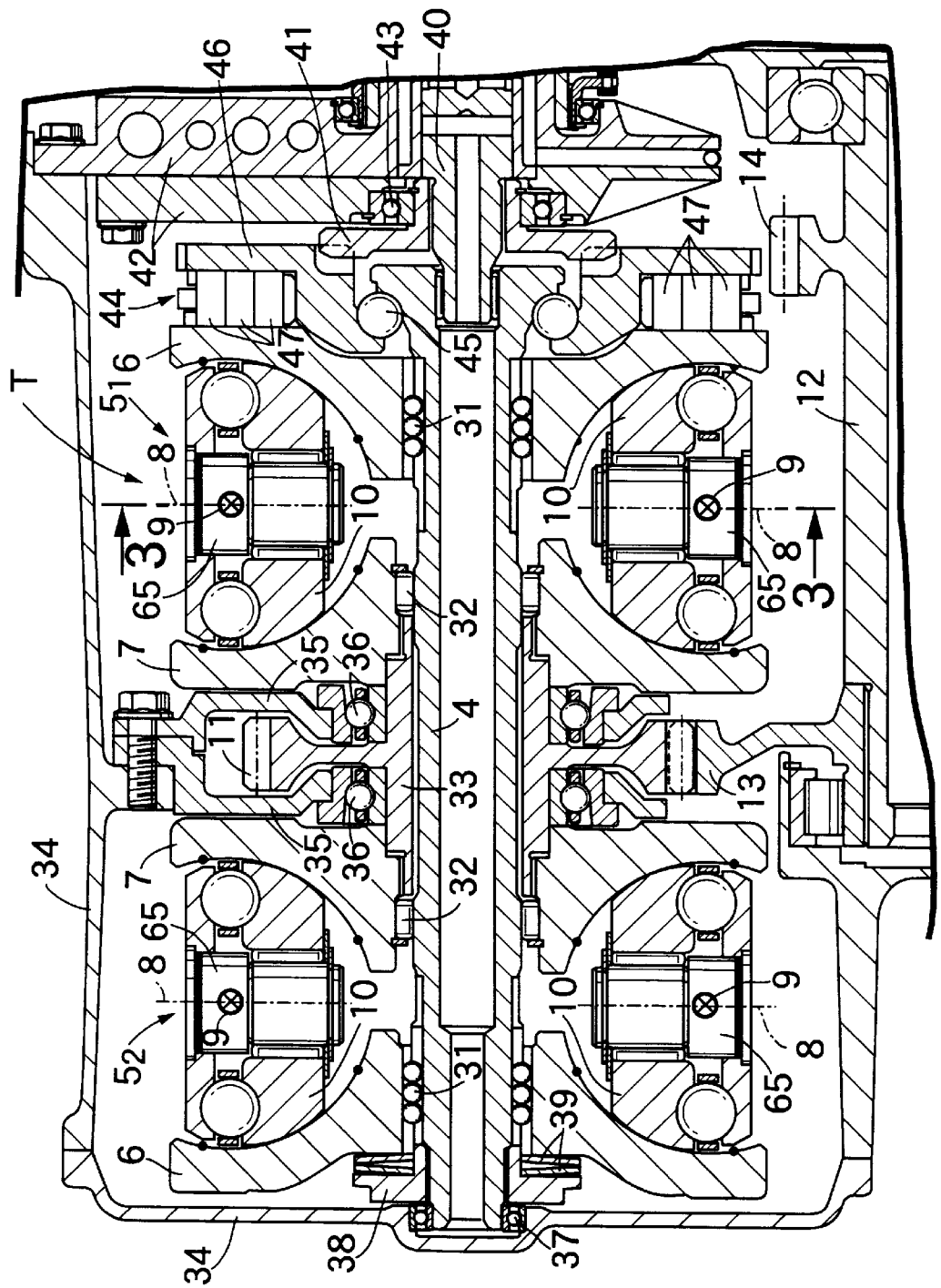
Figure 3:
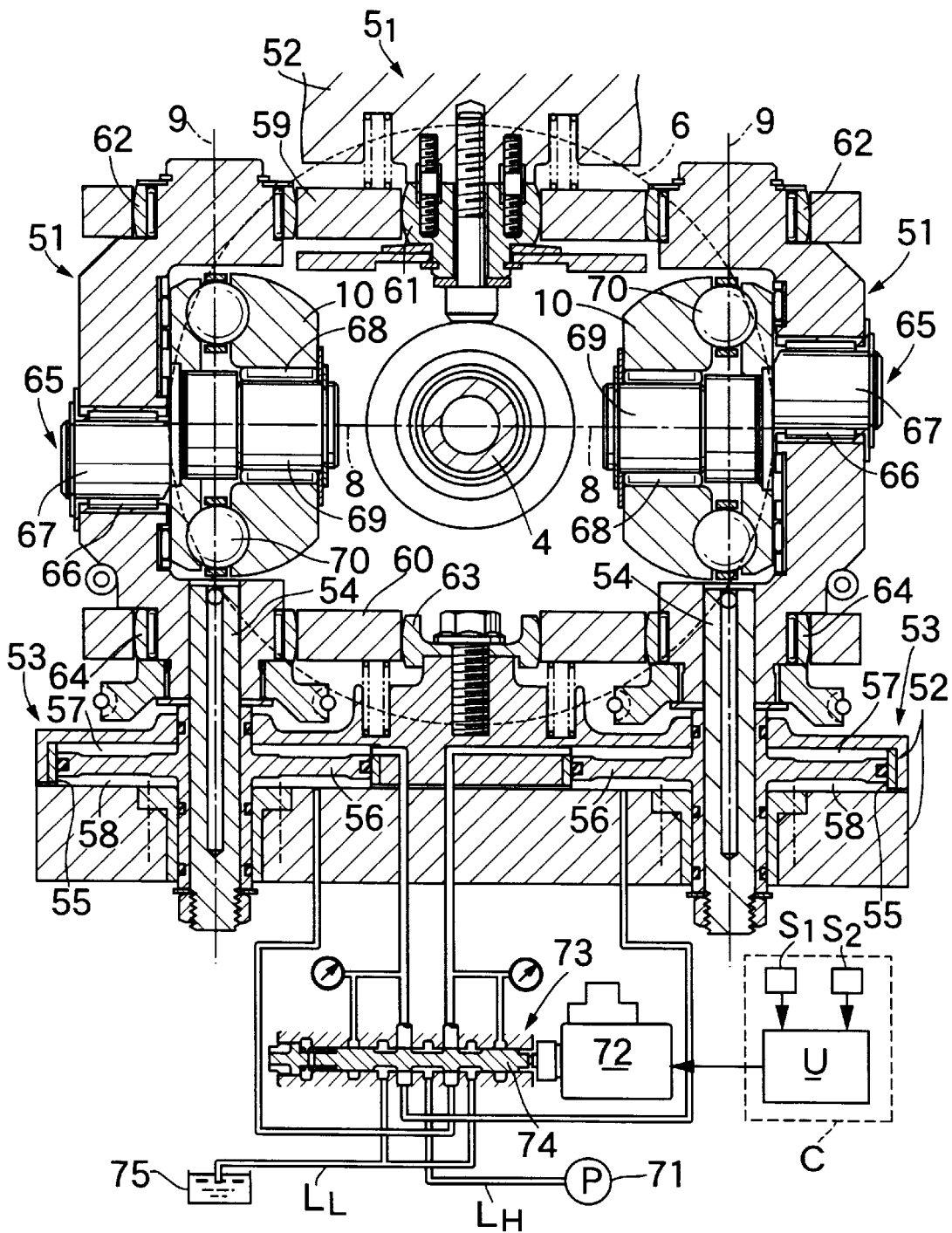

Next, by referring to FIGS. 2 and 3 the construction of the toroidal continuously variable transmission T will be further described in more detail.

As can be seen from FIG. 2, the input disks 6, 6 of the first and the second continuously variable speed change mechanisms $5_1$, $5_2$ are supported axially slidably and relatively unrotatably on the main shaft 4 through ball splines 31, 31. The output disks 7, 7 are supported axially slidably and relatively rotatably on the main shaft 4 through roller bearings 32, 32. Axial ends of a collar 33 integrally formed with the central part of the output gear 11 are splined relatively unrotatably to the output disks 7, 7. The collar 33 of the output gear 11 is supported on partition wall members 35, 35 secured to a casing 34 of the transmission M through a pair of ball bearings 36, 36.

The front end of the main shaft 4 is supported on the casing 34 through a ball bearing 37. A spring seat 38 and coned disk springs 39, 39 are disposed between the ball bearing 37 and the input disk 6 of the second continuously variable speed change mechanism. A base end of the main shaft 4 is fitted coaxially over the outer circumference of an input shaft 40 extending from the torque converter 3 (see FIG. 1). A drive plate 41 splined to the outer circumference of the input shaft 40 is supported on a hydraulic pressure control block 42 secured to the casing 34 through a ball bearing 43. A torque cam 44 disposed between the drive plate 41 and the input disk 6 of the first continuously variable speed change mechanism 5₁ is supported on the base end of the main shaft 4 through a ball bearing 45, and comprises a cam plate 46 meshed and rotated with the drive plate 41, and a plurality of rollers 47 . . . disposed between the cam plate 46 and the input disk 6.

The resilient force of the coned disk springs 39, 39 urges the input disk 6 of the second continuously variable speed change mechanism $5_2$ toward the right in FIG. 2, while the input disk 6 of the first continuously variable speed change mechanism $5_1$ is urged toward the left in FIG. 2 in accordance with an engine torque input from the input shaft 40 through the torque cam 44. As a result, the input disk 6 and the output disk 7 of the first continuously variable speed change mechanism $5_1$ generate surface pressures that compress the power rollers 10, 10 so that they cannot slip, and at the same time the input disk 6 and the output disk 7 of the second continuously variable speed change mechanism $5_2$ generate surface pressures that compress the power rollers 10, 10 so that they cannot slip.

FIG. 3 shows a transverse cross section of the first continuously variable speed change mechanism $5_1$. Left and right trunnions 51, 51 that support the pair of power rollers 10, 10 are arranged on both sides of the main shaft 4 as they pinch the main shaft. The shaft 4 is interposed between the pair of power rollers. Piston rods 54, 54 of left and right hydraulic actuators 53, 53 provided in the hydraulic pressure control block 52 are connected to the lower ends of the trunnions 51, 51. The hydraulic actuators 53, 53 comprise cylinders 55, 55 formed in the hydraulic pressure control block 52, pistons 56, 56 slidably fitted in the cylinders 55, 55 and connected to the piston rods 54, 54, upper hydraulic chambers 57, 57 formed on the upper side of the pistons 56, 56, and lower hydraulic chambers 58, 58 formed on the lower side of the pistons 56, 56.

The piston rods 54, 54 are coaxially arranged with the trunnion axes 9, 9, so that the trunnions 51, 51 are tiltable about the trunnion axes 9, 9 with the piston rods 54, 54 as support shafts. When a hydraulic pressure is supplied to the upper hydraulic chamber 57 of one of the left and right hydraulic actuators 53, 53, the hydraulic pressure is also fed to the lower hydraulic chamber 58 of the other hydraulic actuator 53. Conversely, when the hydraulic pressure is supplied to the lower hydraulic chamber 58 of one of the pair of hydraulic actuators 53, 53, the pressure is also supplied to the upper hydraulic chamber 57 of the other hydraulic actuator 53. Hence, the left and right piston rods 54, 54 are driven in opposite directions. That is, when one of the left and right trunnions 51, 51 is moved up along the trunnion axis 9, the other is moved down along the trunnion axis 9.

To ensure that the upward and downward movement of the left and right trunnions 51, 51 are synchronized, the left and right trunnions 51, 51 are connected at their upper ends by an upper yoke 59 and at their lower ends by a lower yoke 60. That is, the central portion of the upper yoke 59 is swingably supported on the hydraulic pressure control block 52 through a spherical joint 61, and the left and right end portions of the upper yoke 59 are swingably and rotatably supported on the upper end portions of the left and right trunnions 51, 51 through spherical joints 62, 62. The lower yoke 60 has its central portion swingably supported on the hydraulic pressure control block 52 through a spherical joint 63 and also has its left and right end portions swingably and rotatably supported on the lower end portions of the left and right trunnions 51, 51 through spherical joints 64, 64.

Pivot shafts 65, 65 that support the power rollers 10, 10 on the trunnions 51, 51 comprise trunnion support portions 67, 67 rotatably supported on the trunnions 51, 51 through roller bearings 66, 66, and power roller support portions 69, 69 that rotatably support the power rollers 10, 10 through roller bearings 68, 68. One pivot shaft 65 has its trunnion support portion 67 off-centered downwardly with respect to the power roller support portion 69, while the other pivot shaft 65 has its trunnion support portion 67 off-centered upwardly with respect to the power roller support portion 69. Ball bearings 70, 70 are interposed between the power rollers 10, 10 and the trunnions 51, 51 to permit smooth relative movement of the power rollers 10, 10 with respect to the trunnions 51, 51.

A four-way valve 73 operated by a linear solenoid 72 is installed between an oil pump 71 and the hydraulic actuators 53, 53. When a spool 74 of the four-way valve 73 is moved to the left in FIG. 3 by the linear solenoid 72, a high pressure oil path $L_H$ connecting to the oil pump 71 communicates with the upper hydraulic chamber 57 of the left hydraulic actuator 53 and with the lower hydraulic chamber 58 of the right hydraulic actuator 53, and at the same time a low pressure oil path $L_L$ connecting to an oil tank 75 communicates with the lower hydraulic chamber 58 of the left hydraulic actuator 53 and with the upper hydraulic chamber 57 of the right hydraulic actuator 53, causing the right trunnion 51 to move down and the left trunnion 51 to move up. Conversely, when the spool 74 of the four-way valve 73 is driven to the right in FIG. 3 by the linear solenoid 72, the high pressure oil path $L_H$ connecting to the oil pump 71 communicates with the upper hydraulic chamber 57 of the right hydraulic actuator 53 and with the lower hydraulic chamber 58 of the left hydraulic actuator 53, and at the same time the low pressure oil path $L_L$ connecting to the oil tank 75 communicats with the lower hydraulic chamber 58 of the right hydraulic actuator 53 and with the upper hydraulic chamber 57 of the left hydraulic actuator 53, causing the right trunnion 51 to move down and the left trunnion 51 to move up.

Then, when the trunnions 51, 51 move in the direction of trunnion axes 9, 9, the power rollers 10, 10 are tilted together with the trunnions 51, 51 about the trunnion axes 9, 9 in the direction of arrow A or B in FIG. 1 by reaction forces they receive from the input disk 6 and the output disk 7, thereby continuously and synchronously changing the transmission ratios of the first and the second continuously variable speed change mechanisms $5_1$, $5_2$.

As shown in FIG. 3, a control means C for controlling the transmission ratio i of the toroidal continuously variable transmission T by operating the four-way valve 73 through the linear solenoid 72 comprises an input revolution speed detection means $S_1$ for detecting a revolution speed ω of the input disk 6, an output revolution speed detection means $S_2$ for detecting a revolution speed $ω_2$ of the output disk 7, and an electronic control unit U in the form of a microcomputer.

Figure 6:
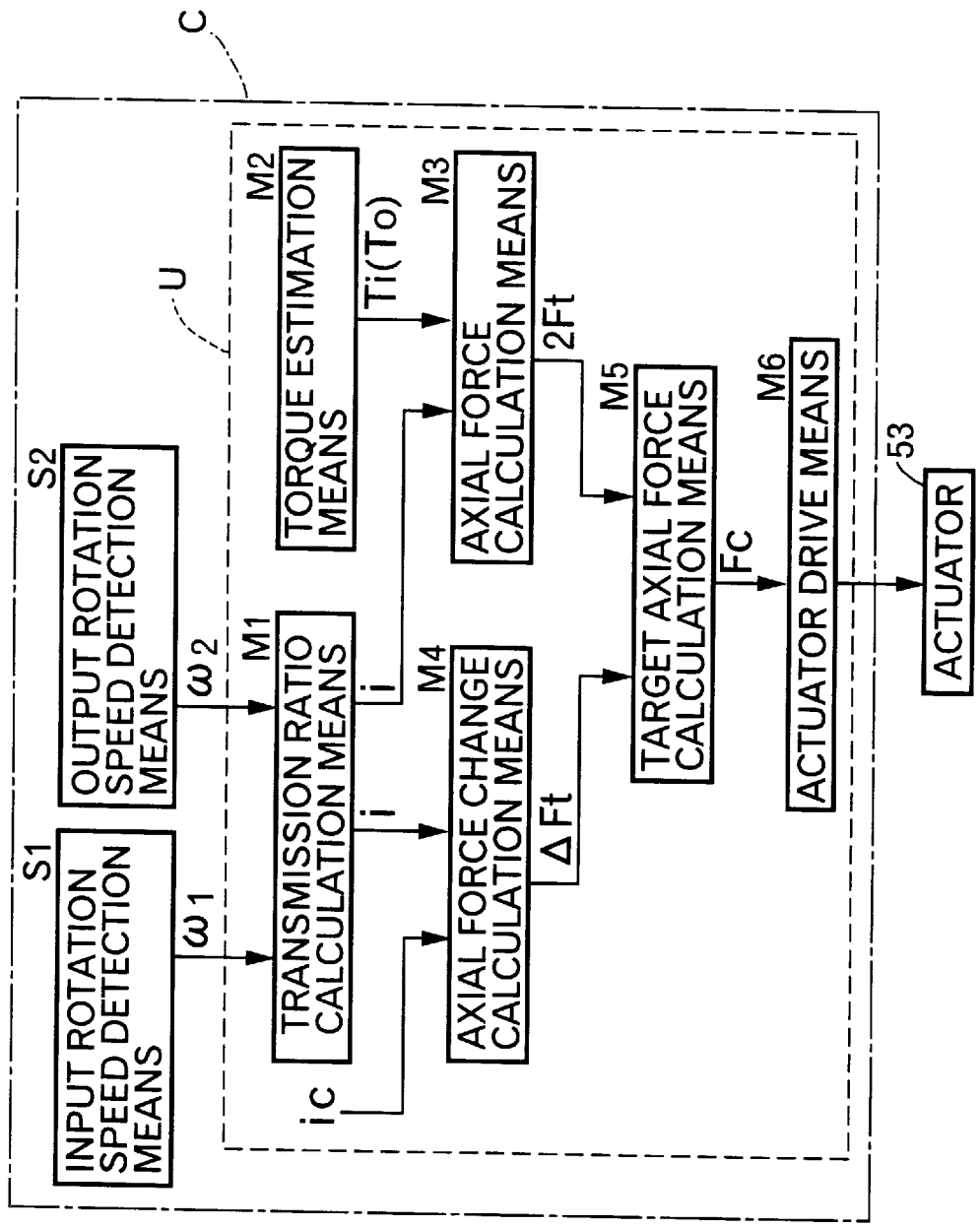
Figure 7:
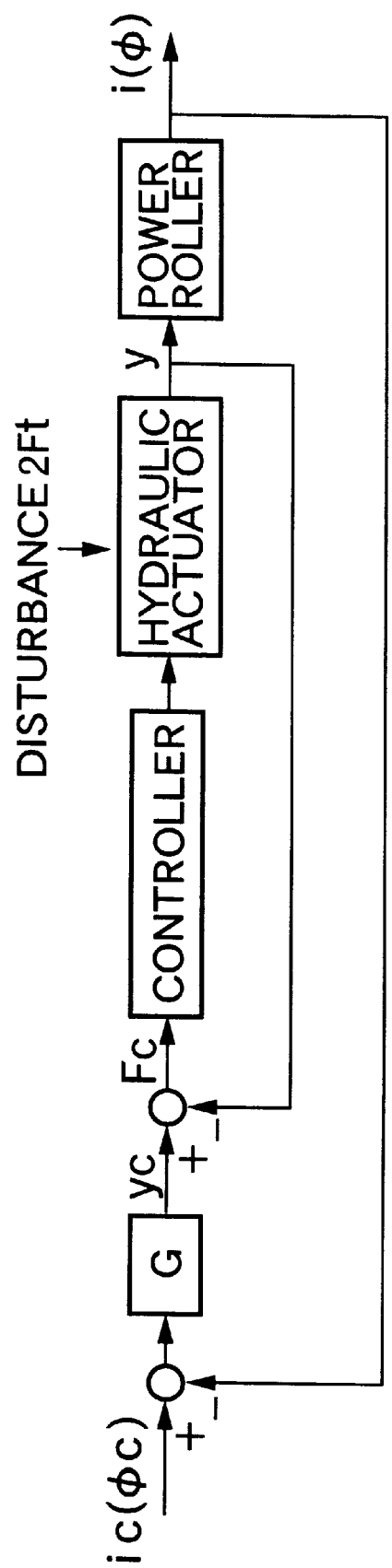
FIG. 7 is a block diagram of a control system for the conventional toroidal continuously variable transmission.

As shown in FIG. 6, the electronic control unit U includes a transmission ratio calculation means M1, a torque estimation means M2, an axial force calculation means M3, an axial force change calculation means M4, a target axial force calculation means M5, and an actuator drive means M6.

Next, the operation of this embodiment will be explained by referring to FIGS. 4 to 6.

Figure 4:
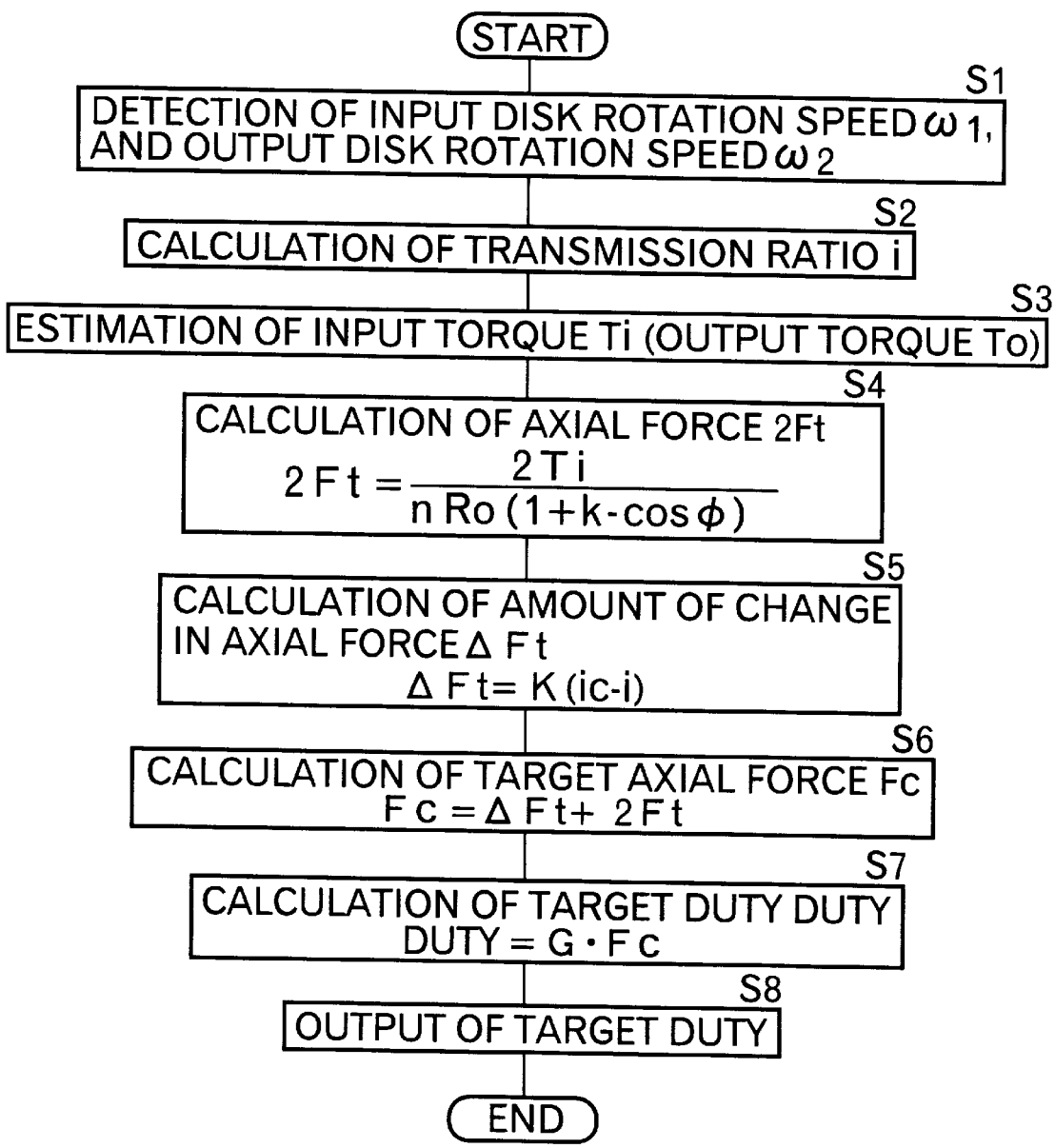

First, in step S1 of the flow chart of FIG. 4, the input revolution speed detection means $S_1$ detects the revolution speed $\omega_1$ of the input disk 6, and the output revolution speed detection means $S_2$ detects the revolution speed $\omega_2$ of the output disk 7. Next, in step S2, the transmission ratio calculation means M1 calculates the transmission ratio i from the input disk revolution speed $\omega_1$ and the output disk revolution speed $\omega_2$. The transmission ratio i is given by $i=\omega_1/\omega_2$.

In step S3, the torque estimation means M2 estimates an input torque Ti inputted to the input disk 6 or an output torque To outputted from the output disk 7. The input torque Ti can be estimated, based on both the engine torque which is calculated from an engine revolution speed and an intake air negative pressure, and the torque amplification factor calculated from a slippage rate of the torque converter. The output torque To can be calculated by applying the relationship of $\omega_1/\omega_2=To/Ti$ to the input torque Ti.

Next, in step S4, the axial force calculation means M3 calculates the axial forces 2Ft of the trunnions 51, 51 based on the input torque Ti (or output torque To) and the transmission ratio i. In a stage prior to calculating the axial forces 2Ft, the tilt angles $\phi$ of the power rollers 10, 10 are calculated from the transmission ratio i. The relationship between the transmission ratio i and the tilt angle $\phi$ is determined by a geometrical structure of the toroidal continuously variable transmission T and is given by the following expression. It is also possible to use a precalculated conversion table and search for the tilt angle $\phi$ from the transmission ratio i.

$$i = \omega_1/\omega_2 = To/Ti = R_2/R_1 \quad (1)$$
$$= \{1 + k - \cos(2\theta - \phi)\}/(1 + k - \cos\phi)$$

where $$k=(D/2R_0)-1 \quad (2)$$

$R_0$: Radius of curvature of the input disk
$R_1$: Rolling radius of the input disk
$R_2$: Rolling radius of the output disk
$\theta$: One-half of the contact angle of power roller
D: Toroidal cavity diameter Based on $\phi$ given by equation (1) and k given by equation (2), the axial forces 2Ft of the trunnions 51, 51 can be given by $$2FT = 2Ti/nR_1 \quad (3)$$
$$= 2To/nR_2$$
$$= 2Ti/\{nR_0(1+k-\cos\phi)\}$$
$$= 2To/[nR_0\{1+k-\cos(2\theta-\phi)\}]$$

where n denotes the number of power rollers. For the process of deriving the above equations (1) to (3), see H. Tanaka, Power Transmission of a Cone Roller Toroidal Traction Drive, JSME Series III, Vol. 32, No. 1, 1989.

Next, in step S5, the axial force change calculation means M4 calculates an amount of change in axial force ΔFt, which is a gain K times a deviation between the target transmission ratio ic and the transmission ratio i, and is given by $$\Delta Ft=K(ic-i) \quad (4)$$

Then, in step S6, the target axial force calculation means M5 calculates a target axial force Fc as the sum of the axial force change ΔFt and the axial force 2Ft:

$$Fc=\Delta Ft+2Ft \quad (5)$$

Then in step S7, the actuator drive means M6 calculates a target duty DUTY, which is defined as the target axial force Fc multiplied by a gain G:

$$DUTY=GFc \quad (6)$$

In a final step S8, the target duty DUTY is outputted to the linear solenoid 72 to operate the four-way valve 73 and to drive the hydraulic actuators 53, 53 so as to match the transmission ratio i to the target transmission ratio ic.

As described above, because the transmission ratio i can be controlled based on the revolution speed $\omega_1$ of the input disk 6 detected by the input revolution speed detection means $S_1$ and the revolution speed $\omega_2$ of the output disk 7 detected by the output revolution speed detection means $S_2$, without using the positional displacement y of the power rollers 10, 10 in the direction of the trunnion axes 9, 9 or the tilt angle $\phi$ of the power rollers 10, 10 about the trunnion axes 9, 9, there is no need to install on the trunnions 51, 51 the position detection means for detecting the positional displacement y or the tilt angle detection means for detecting the tilt angle $\phi$. This reduction of the size of the trunnions 51, 51 which in turn contributes to reducing the size of the toroidal continuously variable transmission T.

Figure 5:
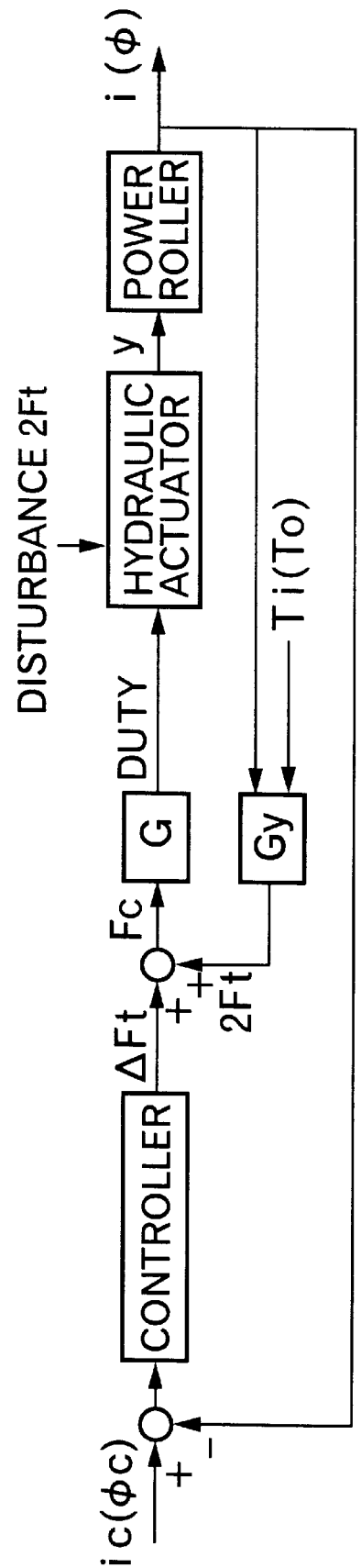

As can be seen from the block diagram of FIG. 5, without performing the feedback control on the positional displacement y of the power rollers 10, 10 in the direction of the trunnion axes 9, 9, the axial force 2Ft of the trunnions 51, 51, which is the most influential disturbance factor, is calculated and feedforward-controlled based on the input torque Ti or output torque To and the transmission ratio i. This enhances the control response, preventing the hunting of the transmission ratio caused by changes in the input/output torques and input/output revolution speeds.

Further, because the target duty DUTY is calculated based on the target axial force Fc, which is obtained by adding to the axial force 2Ft the axial force change ΔFt calculated from the deviation between the target transmission ratio ic and the transmission ratio i, a feedback control system can be obtained that converges the transmission ratio i to the target transmission ratio ic, thus performing a highly precise transmission ratio control.

Considering that the vehicle speed (revolution speed $\omega_2$ of the output disk 7) does not change rapidly in response to the transmission ratio feedback, it is possible to set the revolution speed $\omega_1$ of the input disk 6 as a quantity to be fed back.

The embodiment of this invention has been described above in detail and it should be noted that various design modifications may be made without departing from the spirit of this invention.

For example, while the embodiment employs the hydraulic actuators 53, 53 as the actuators, they may be replaced with electric actuators. Although the embodiment describes a double cavity type toroidal continuously variable transmission T, this invention can also be applied to a single cavity toroidal continuously variable transmission.

What is claimed is:

1. A control system for a toroidal continuously variable transmission comprising:

an input disk and an output disk which are disposed opposed to each other, power rollers which are in abutment against said input disk and said output disk to conduct transmission of a driving force between said input disk and said output disk, trunnions for supporting said power rollers rotatably, said trunnions being supported displaceably in the direction of an axis of said trunnions, and tiltably about said axis, an actuator for displacing said trunnions in the direction of said axis to tilt said power rollers together with said trunnions, and a control means for driving said actuator to control a transmission ratio between said input disk and said output disk, wherein said control means comprises:

an input rotation speed detection means for detecting a rotation speed of said input disk, an output rotation speed detection means for detecting a rotation speed of said output disk, a transmission ratio calculation means for calculating said transmission ratio from the input disk rotation speed and the output disk rotation speed, a torque estimation means for estimating one an input torque of said input disk and an output torque of said output disk, an axial force calculation means for calculating an axial force in the trunnion axis direction that said actuator is required to generate, based on the transmission ratio calculated by said transmission ratio calculation means and the torque estimated by said torque estimation means, and an actuator drive means for driving said actuator based on the axial force calculated by said axial force calculation means.

2. A control system for a toroidal continuously variable transmission according to claim 1, wherein said control system further includes: an axial force change amount calculation means for calculating an amount of change in the axial force based on a deviation between a target transmission ratio and the transmission ratio calculated by said transmission ratio calculation means, and a target axial force calculation means for calculating a target axial force based on the axial force calculated by said axial force calculation means and the amount of change in the axial force calculated by said axial force change amount calculation means, and wherein, based on the target axial force calculated by said target axial force calculation means, said actuator drive means drives the actuator to converge said deviation to zero.

* * * * *